US012558644B2

(12) United States Patent
Schmid et al.

(10) Patent No.: US 12,558,644 B2
(45) Date of Patent: *Feb. 24, 2026

(54) FILTER ELEMENT FOR AN AIR FILTER HAVING A PRIMARY AIR OUTLET AND A SECONDARY AIR OUTLET, AND AN AIR FILTER AND INSTALLATION METHOD

(71) Applicant: MANN+HUMMEL GmbH, Ludwigsburg (DE)

(72) Inventors: Daniel Schmid, Sachsenheim (DE); Matthias Krohlow, Herrenberg (DE); Martin Sonntag, Freiberg (DE); Steffen Pfannkuch, Ludwigsburg (DE); Martin Schmid, Reisbach (DE); Christoph Wittmers, Bietigheim-Bissingen (DE); Robert Hasenfratz, Schwäbisch Hall (DE)

(73) Assignee: MANN+HUMMEL GmbH, Ludwigsburg (DE)

( * ) Notice: Subject to any disclaimer, the term of this patent is extended or adjusted under 35 U.S.C. 154(b) by 649 days.

This patent is subject to a terminal disclaimer.

(21) Appl. No.: 17/883,185

(22) Filed: Aug. 8, 2022

(65) Prior Publication Data

US 2022/0379255 A1 Dec. 1, 2022

Related U.S. Application Data

(63) Continuation of application No. PCT/EP2021/050154, filed on Jan. 7, 2021.

(51) Int. Cl.
| | |
|---|---|
| B01D 46/52 | (2006.01) |
| B01D 46/00 | (2022.01) |
| B01D 46/24 | (2006.01) |

(52) U.S. Cl.
CPC ....... B01D 46/521 (2013.01); B01D 46/0001 (2013.01); B01D 46/0049 (2013.01); B01D 46/2414 (2013.01); *B01D 2271/027* (2013.01)

(58) Field of Classification Search
CPC ............... B01D 46/005; B01D 46/521; B01D 46/2414; B01D 2275/206; B01D 2279/60; F02M 35/02483

(Continued)

(56) References Cited

U.S. PATENT DOCUMENTS

| | | | | |
|---|---|---|---|---|
| 3,740,931 | A | * | 6/1973 | Nowicki ................ F02M 35/09 |
| | | | | 96/419 |
| 5,479,907 | A | * | 1/1996 | Walker, Jr. ............. F02M 35/04 |
| | | | | 123/573 |

(Continued)

FOREIGN PATENT DOCUMENTS

| | | | |
|---|---|---|---|
| DE | 2020050003046 | U1 | 7/2006 |
| DE | 102014006117 | A1 | 10/2015 |

*Primary Examiner* — Vickie Y Kim

(57) ABSTRACT

A filter element has a filter medium annularly surrounding a longitudinal axis of the filter element. The filter medium can be flowed through radially from an exterior to an interior and has a plurality of folds. A first end disk is arranged at a first end face of the filter element. A primary air passage and a secondary air passage are provided. The filter medium has an axial recess at the first end face. The first end disk has a channel forming the secondary air passage and extending in the axial recess. The plurality of folds include first folds in a region of the recess and second folds away from the recess. An axial length of the first folds is reduced relative to an axial length of the second folds. An air filter with such filter element and an assembly method for the air filter are provided.

20 Claims, 2 Drawing Sheets

(58) Field of Classification Search
USPC ......... 55/476, 497, 498, 385.3; 96/147, 419;
210/493.2; 123/198 E
See application file for complete search history.

(56) References Cited

U.S. PATENT DOCUMENTS

| | | | |
|---|---|---|---|
| 6,852,217 B2 * | 2/2005 | Jokschas | F02M 37/34 |
| | | | 210/493.2 |
| 8,052,780 B2 * | 11/2011 | Rotter | F02M 35/10032 |
| | | | 55/502 |
| 8,152,876 B2 * | 4/2012 | Gillenberg | F02M 35/024 |
| | | | 55/504 |
| 8,696,782 B2 * | 4/2014 | Muenkel | B01D 50/20 |
| | | | 55/498 |
| 10,213,723 B2 | 2/2019 | Epli | |
| 11,415,089 B2 * | 8/2022 | Schmid | F02M 35/0245 |
| 2003/0029145 A1 * | 2/2003 | Sudoh | B01D 46/0004 |
| | | | 55/497 |
| 2005/0061292 A1 | 3/2005 | Prellwitz et al. | |
| 2007/0251392 A1 * | 11/2007 | Tschech | F02M 35/10144 |
| | | | 96/147 |
| 2008/0282654 A1 * | 11/2008 | Matschl | F02M 35/0203 |
| | | | 55/385.3 |
| 2009/0019710 A1 * | 1/2009 | Grossman | F01P 11/06 |
| | | | 30/514 |
| 2014/0260136 A1 * | 9/2014 | Kaiser | F01N 3/303 |
| | | | 55/476 |
| 2015/0020486 A1 | 1/2015 | Pettersson et al. | |
| 2018/0369732 A1 | 12/2018 | Karlsson et al. | |
| 2020/0376425 A1 | 12/2020 | Neef | |

* cited by examiner

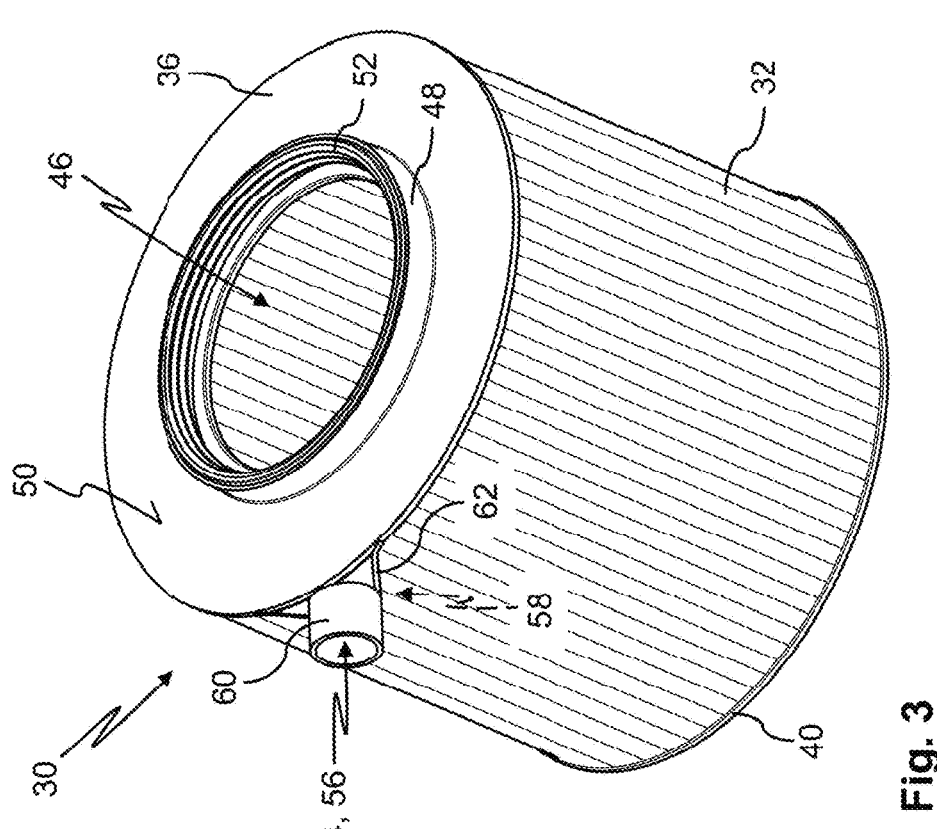
Fig. 3
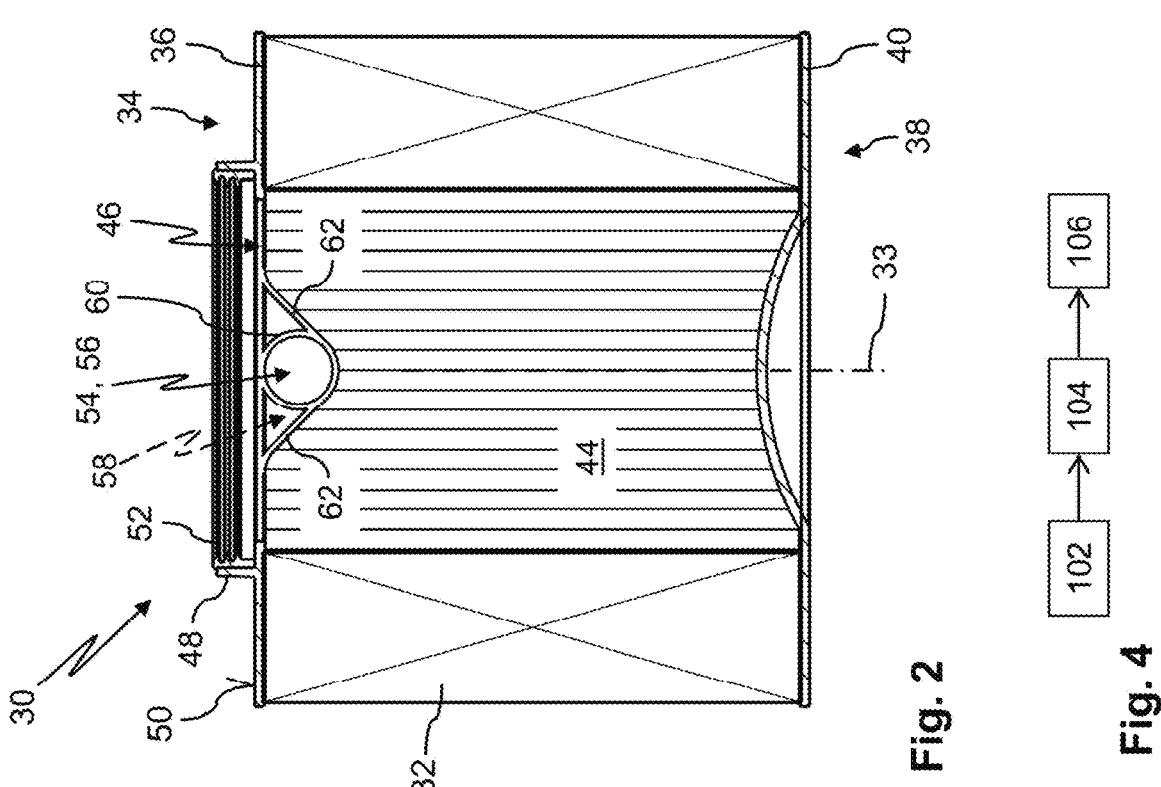
Fig. 2
Fig. 4

FILTER ELEMENT FOR AN AIR FILTER HAVING A PRIMARY AIR OUTLET AND A SECONDARY AIR OUTLET, AND AN AIR FILTER AND INSTALLATION METHOD

CROSS-REFERENCE TO RELATED APPLICATIONS

This application is a continuation application of international application No. PCT/EP2021/050154 having an international filing date of 7 Jan. 2021 and designating the United States, the international application claiming a priority date of 6 Feb. 2020 based on prior filed German patent application No. 10 2020 103 044.4, the entire contents of the aforesaid international application and the aforesaid German patent application being incorporated herein by reference.

BACKGROUND OF THE INVENTION

The invention concerns a filter element for an air filter with a raw air inlet, a primary air outlet, and a secondary air outlet, such an air filter as well as an assembly method therefor.

Air filters with a primary air outlet and a secondary air outlet for filtered air are used, for example, in internal combustion engines of motor vehicles. The primary air outlet serves typically for providing (filtered) clean air for use in the combustion in the internal combustion engine. The secondary air outlet can serve, for example, for providing (filtered) clean air for use in an exhaust gas manifold of the internal combustion engine, in particular for exhaust gas aftertreatment.

EP 1 451 464 B1 describes an intake air filter for an internal combustion engine, with a filter housing that comprises a raw air inlet and a clean air outlet as well as a clean-side secondary air outlet. The intake air filter comprises an annular filter insert arranged in the filter housing and to be flowed through radially from the exterior to the interior. The annular filter insert comprises at an axial end a first end disk that comprises at least one opening through which the clean air outlet communicates with an interior of the annular filter insert. At an axial end which is facing away from the first end disk, the annular filter insert comprises a second end disk that comprises at least one opening through which the secondary air outlet communicates with the interior of the annular filter insert, wherein a connection socket is embodied at the second end disk.

A similar air filter is also known from WO 2017/103048 A1.

WO 2012/172017 A1 describes a filter element with an annular filter body which surrounds an interior in circumferential direction. In an end disk of the filter element, a main connector is embodied that is connected in fluid communication to the interior. The filter body comprises a channel which extends axially and which is radially open, wherein an auxiliary connector that is connected in fluid communication with the interior is arranged in the region of the channel.

DE 10 2014 006 117 B4 discloses a filter element embodied as a flat filter wherein a filter medium body of the filter element is of a curved configuration and surrounds a flow chamber at least partially. The inwardly positioned flow chamber communicates via a flow socket with the exterior side at the filter element. The flow socket projects radially in relation to its longitudinal axis with one half into a cutout, open at a rim, in the filter medium body and projects partially past an end disk.

It is an object of the invention to provide an air filter with a primary air outlet and a secondary air outlet as well as a filter element therefor in which a flow through the primary air outlet is not significantly influenced by a flow through the secondary air outlet.

SUMMARY OF THE INVENTION

The object is solved by a filter element that is hollow-cylindrical and comprises a filter medium that annularly surrounds a longitudinal axis of the filter element, wherein the filter medium can be flowed through radially from the exterior to the interior and comprises a plurality of folds, and further comprises a first end disk, wherein the filter element comprises a preferably central primary air passage and a secondary air passage, wherein the filter medium comprises at a first end face an axial recess in which a channel of the first end disk forming the secondary air passage extends, wherein an axial length of the folds of the filter medium in the region of the recess is reduced relative to the other folds.

The object is solved by an air filter comprising a filter housing with a raw air inlet, a primary air outlet, and a secondary air outlet, and comprising a filter element according to the invention that separates in the filter housing a raw side communicating with the raw air inlet from a clean side, wherein the primary air outlet via the primary air passage and the secondary air outlet via the secondary air passage communicate with the clean side.

The scope of the present invention encompasses furthermore a method for assembly of an air filter according to the invention, with a primary air outlet and a secondary air outlet, wherein the method comprises the steps of a) inserting the filter element into a housing element of the filter housing, in particular in axial direction, and b) rotating the filter element about the longitudinal axis so that the passage socket and the outlet socket are connected seal-tightly to each other.

Preferred embodiments or variants are disclosed in the respective dependent claims and the description.

Filter Element According to the Invention

A hollow-cylindrical filter element is provided in accordance with the invention. The filter element comprises a filter medium. The filter medium annularly surrounds a longitudinal axis of the filter element. For the description of the present invention, the directional information, for example, radial, axial, or eccentric—if nothing to the contrary is mentioned—relates to the longitudinal axis of the filter element. The filter medium can be flowed through radially from the exterior to the interior. Thus, a clean side of the filter element is embodied radially inside of the filter medium. The filter medium can be comprised of cellulose fibers, synthetic fibers, glass fibers or mixed media of the mentioned fiber types. The filter element comprises moreover a first end disk. As a matter of principle, the first end disk is sealingly connected, typically material-fused, to the filter medium. The filter medium can be welded to the first end disk (preferably by thermal plastification of the first end disk, in particular by means of infrared radiation), glued on or embedded by foaming in the first end disk. The first end disk comprises typically an annularly circumferentially extending front face which extends in a plane that is preferably perpendicular to the longitudinal axis. The first end disk can be comprised of plastic material or polyurethane foam.

The filter element comprises a primary air passage and a secondary air passage. The primary air passage is preferably embodied centrally, in particular coaxially to the longitudinal axis, at the filter element. Filtered air (clean air) can flow out of or can be removed from the interior of the filter element, i.e., from the clean side, via the primary air passage and the at least one secondary air passage.

According to the invention, the filter medium comprises an axial recess at a first end face. Aside from the recess, the filter medium, as a matter of principle, is of a planar configuration at the first end face. The recess forms a depression or reduction of the height of the filter medium in relation to its—otherwise typically planar—first end face. One could also say that the length of the filter medium body formed of the filter medium is reduced in the region of the recess. The first end disk is arranged as a matter of principle at the first end face. The first end disk comprises a channel which forms the secondary air passage. The channel extends in the recess of the filter element. The channel, which forms the secondary air passage that is spatially separated from the primary air passage, enables branching off a secondary air flow from the clean side of the filter element. In this way, an influence on the flow through the primary air passage by the flow through the secondary air passage can be at least reduced or preferably avoided. In particular, it can be achieved by means of the separate clean air passages that a flow rate profile of the air flow in a primary air outlet of a filter housing with the filter element is not influence qualitatively, or at least not significantly, by air flowing or not flowing through the secondary air passage and a correlated secondary air outlet of the filter housing, respectively, by how large a volume flow or mass flow of clean air through the secondary air passage is.

Preferably, the first end disk encloses the channel at least partially circumferentially, preferably completely circumferentially. In other words, the channel can be completely circumferentially delimited by the first end disk. The channel is thus sealed inherently by the first end disk in relation to the filter medium. An additional sealing of the channel relative to the filter medium is not required. A wall which at least partially circumferentially encloses the channel is embodied in this context in particular as one piece together with the end disk.

The channel can extend radially relative to the longitudinal axis of the filter element. In particular, the entire channel can extend straight. This is advantageous in respect to manufacture, in particular of the first end disk as well as of the filter medium.

Alternatively, the channel can originate radially inwardly at the filter medium and can penetrate an axial front face of the first end disk. This can be advantageous in respect to the arrangement of a secondary air outlet at a filter housing for the filter element. For this purpose, the channel can extend at a slant to the longitudinal axis or curved.

Preferably, it is provided that the recess, originating at the first end face, tapers in axial direction. The recess is thus embodied without undercuts. This simplifies the seal-tight connection of the first end disk to the filter medium in the region of the recess.

The first end disk can comprise at least one seal surface, preferably two seal surfaces, for sealing the filter medium at the recess. The filter medium can be embedded in the seal surfaces or can be glued to the seal surfaces. Preferably, the seal surface(s) is/are positioned at a slant in relation to the longitudinal axis. In this way, the correct orientation of the first end disk at the recess can be simplified, in particular when the recess tapers in axial direction.

The filter medium is preferably folded in a star shape. In this way, an effective filter surface of the filter medium can be enlarged without the outer dimensions of the filter element being increased. Fold edges of the filter medium extend typically in axial direction. An (axial) length of the folds of the filter medium is reduced in the region of the recess in relation to the other folds.

The recess can be produced by cutting the filter medium by means of laser radiation, a preferably rolling knife, ultrasonics, a band saw or water jet cutting. When the filter medium is folded to a star shape, the filter medium is typically cut prior to folding. In special cases, the filter medium can also be cut after folding, in particular by use of ultrasonics.

Typically, the filter element comprises a second end disk at a second end face. The first and the second end faces are embodied at the filter element so as to axially face away from each other.

The primary air passage can be embodied in the second end disk. In this case, the primary air passage and the secondary air passage are separated particular far apart from each other so that a mutual influence of the flow is reduced.

Preferably, the second end disk is of a closed configuration. In this case, the primary air passage is embodied at the first end disk. This can be advantageous in respect to the installation of the filter element in a filter housing. Due to the separation of the primary air passage from the secondary air passage, a mutual influence of the flow is also sufficiently reduced in this embodiment.

The primary air passage can be in particular embodied by a central aperture, preferably coaxial to the longitudinal axis, in the first or second end disk. In the region of the primary air passage, a seal element can be held at the first or second end disk, in particular molded to the first or second end disk. The seal element can be comprised of an elastomer or polyurethane foam.

It can be provided that the channel extends through a passage socket arranged eccentrically at the filter element. The passage socket can simplify the connection of the secondary air passage to a secondary air outlet of a filter housing. At least an end of the eccentric passage socket facing away from the filter element, preferably the entire passage socket, is not arranged on the longitudinal axis. The passage socket can project radially or axially away from the filter element. The passage socket thus projects in radial or axial direction past the filter medium or an axial front face of the first end disk. In special cases, the passage socket can terminate flush with the filter element. The passage socket is typically embodied as one piece together with the first end disk.

At the free end of the passage socket, a seal element can be held. When exchanging the filter element, the seal element is thus also exchanged. In this way, it can be achieved that the connection of the passage socket to the secondary air outlet of the filter housing comprises the required seal tightness properties after the exchange of the filter element. The seal element can be comprised of an elastomer or polyurethane. Preferably, the seal element is molded to the passage socket or is formed as one piece together with the passage socket.

Air Filter According to the Invention

The scope of the present invention also encompasses an air filter. The air filter comprises a filter housing with a raw air inlet, a primary air outlet, and a secondary air outlet. Moreover, the air filter comprises a filter element as described above in accordance with the invention that separates in the filter housing a raw side, communicating with the raw air inlet, from a clean side. The raw side and the clean side can also be referred to as a raw chamber, respectively, clean chamber. In operation of the filter, raw air to be filtered flows via the raw air inlet into the raw side of the housing. From the raw side, the air passes through the filter medium to the clean side whereby dirt particles can be separated from the air and retained in the filter medium.

According to the invention, the primary air outlet communicates via the primary air passage and the secondary air outlet communicates via the secondary air passage communicate with the clean side. In other words, the primary air outlet is connected in fluid communication via the primary air passage to the clean side; the secondary air outlet is connected in fluid communication via the secondary air passage to the clean side. In operation of the air filter, from the clean side filtered clean air can be removed from the air filter or flow out of the air filter via the primary air outlet and the secondary air outlet. In this context, a volume flow or mass flow of clean air flowing through the primary air outlet is typically significantly larger than a volume flow or mass flow of clean air which is flowing through the secondary air outlet. Due to the constructive separation according to the invention of the secondary air passage from the primary air passage at the filter element, an influence on the flow through the primary air outlet by the flow through the secondary air outlet can be avoided or at least significantly reduced.

The air filter can be part of an internal combustion engine, in particular of a motor vehicle. Through the primary air outlet, the combustion engine can be supplied with filtered combustion air, in particular wherein an air mass meter is arranged adjoining the primary air outlet. By means of the secondary air outlet, for example, an exhaust gas aftertreatment device can be connected to the air filter and, as needed, supplied with filtered clean air.

When the channel extends through a passage socket, arranged eccentrically at the filter element and in particular projecting radially, the passage socket can be connected sealingly to an outlet socket of the filter housing. The secondary air outlet is embodied at the outlet socket. In particular, the outlet socket can annularly surround the secondary air outlet. The outlet socket typically projects past a housing wall of the filter housing inwardly. In other words, the outlet socket typically projects from the housing wall into a housing interior of the filter housing. Between the outlet socket and the passage socket, a seal element can be arranged. The outlet socket at the filter housing, on the one hand, can simplify the installation of the filter element in the filter housing. On the other hand, the outlet socket can simplify the connection of a device to be supplied with secondary air at the air filter. For this purpose, the outlet socket can project outwardly past the housing wall. In special cases, the outlet socket can terminate inwardly and/or outwardly flush with the housing wall.

Assembly Method According to the Invention

The scope of the present invention encompasses furthermore a method for assembly of an air filter according to the invention in which an eccentric passage socket through which the channel is extending is connected sealingly to an outlet socket of the filter housing. The method comprises the steps:

a) inserting the filter element into a housing element of the filter housing, b) rotating the filter element about a longitudinal axis so that the through passage and the outlet socket are seal-tightly connected to each other.

Prior to performing step a), the housing element and a further housing element can be released from each other, as needed. In this way, an access for insertion of the filter element into the housing element is created. The housing element can be a housing pot or a housing cover. Correspondingly, the further housing element can be a housing cover or a housing pot.

In step a), the filter element is arranged at the housing element. As a matter of principle, the primary air outlet and the secondary air outlet are embodied at the housing element. Preferably, the filter element is inserted in axial direction into the housing element. In this context, typically the primary air passage of the filter element is connected to the primary air outlet of the housing element. The passage socket and the outlet socket are displaced relative to each other as a matter of principle in circumferential direction. The axial position of the filter element in the filter housing to be provided in step a) can be defined by an axial stop.

In step b), the passage socket is connected seal-tightly to the outlet socket. In this way, a fluid connection of the secondary air outlet to the clean side of the filter element is established via the channel which extends in the passage socket. This connection is obtained in a simple manner by rotation of the filter element.

Preferably, the rotational end position to be established in step b) is defined by a rotational stop between the filter housing and the filter element. The rotational stop is typically embodied at the housing element. The rotational stop can hold the filter element in the rotational end position. In this way, it can be achieved that the seal-tight connection of the passage socket to the outlet socket is not accidentally released in operation of the air filter. In particular, the filter element can be locked at the filter pot.

Due to the method according to the invention, the installation of the filter element is divided into two simple partial movements. At the same time, the seal-tight connection established thereby of the outlet socket and the passage socket prevents that the clean side and the raw side can accidentally communicate with each other via the secondary air passage. Thus, on the one hand, a leakage of clean air from the clean side to the raw side and, on the other hand, an inflow of unfiltered raw air from the raw side to the clean side is prevented.

Typically, in step c) the housing element and the further housing element are connected to each other. In this way, the filter housing is closed to the exterior.

BRIEF DESCRIPTION OF THE DRAWINGS

Further features and advantages of the invention result from the following detailed description of embodiments of the invention, from the claims as well as based on the Figures of the drawing that illustrate details according to the invention. The aforementioned and still to be explained features can be realized each individually by themselves or several combined in arbitrary expedient combinations in variants of the invention. The features illustrated in the drawing are illustrated such that the particularities according to the invention can be made clearly visible.

FIG. 2 shows the filter element of the air filter of FIG. 1 in a further schematic section view.

FIG. 3 shows the filter element of the air filter of FIG. 1 in a schematic perspective view.

FIG. 4 shows a schematic flowchart of an assembly method according to the invention.

DESCRIPTION OF PREFERRED EMBODIMENTS

Figure 1:
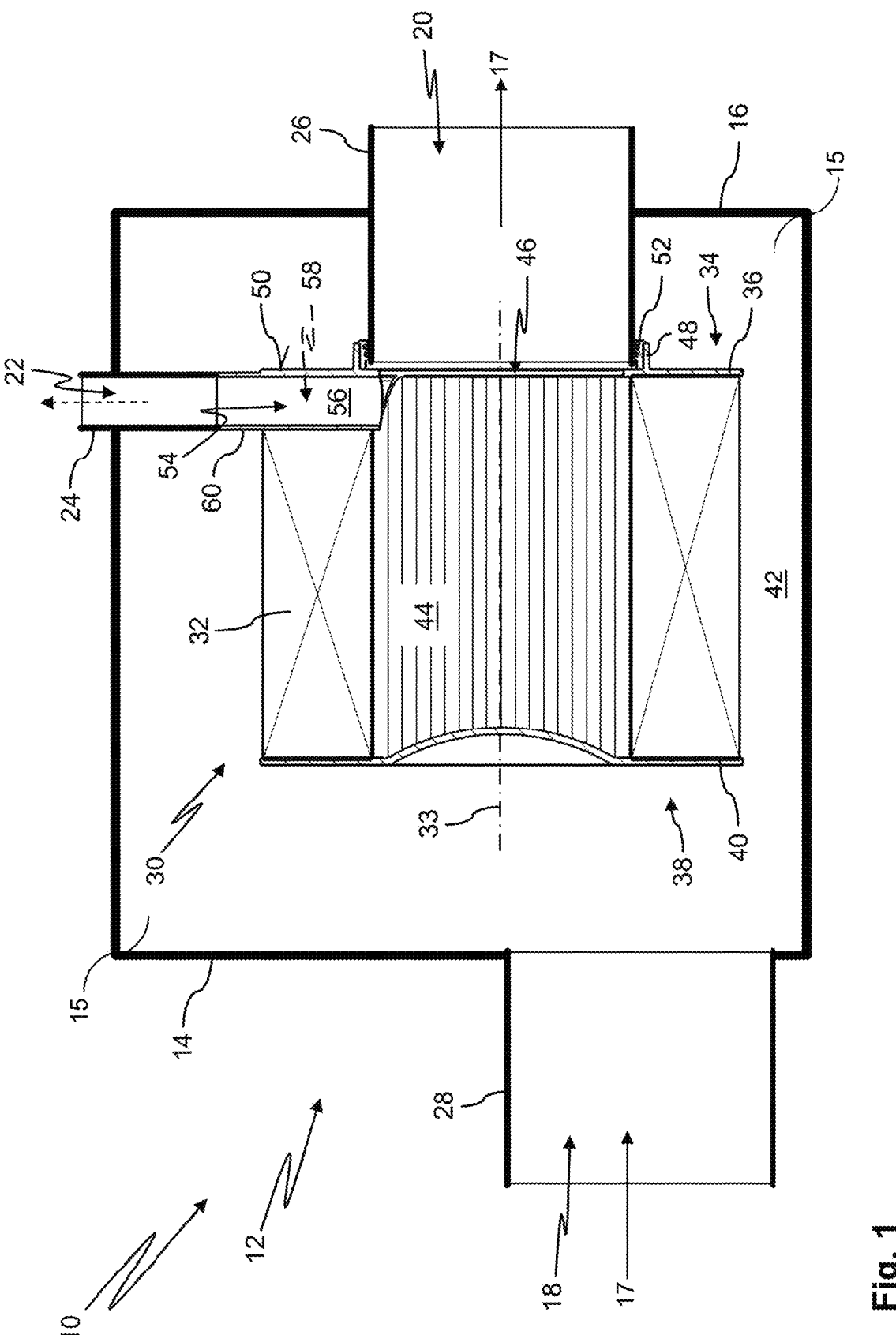
FIG. 1 shows an air filter according to the invention, in a schematic section view, with a filter housing at which a primary air outlet and a secondary air outlet are embodied and with a filter element according to the invention that is arranged in the filter housing and that comprises a filter medium and a first end disk, wherein at the first end disk a primary air passage and a secondary air passage are formed, wherein the secondary air passage extends in the form of a channel in an axial recess of the filter medium.

FIG. 1 shows an air filter 10. The air filter 10 comprises a filter housing 12. The filter housing 12 can comprise a housing pot 16 and a housing cover 14. The filter housing 12 is illustrated in FIG. 1 in a greatly schematized manner. The housing pot 16 and the housing cover 14 are connected seal-tightly to each other for operation of the air filter 10. The filter housing 12 comprises a raw air inlet 18, a primary air outlet 20, and a secondary air outlet 22. The raw air inlet 18 is embodied here at the housing pot 16. The primary air outlet 20 and the secondary air outlet 22 are presently embodied at the housing cover 14. The filter housing 12 can be divided diagonally as is illustrated schematically by the wavy lines 15. The flow through the filter housing 12 is indicated by arrows 17.

The secondary air outlet 22 can be embodied at an outlet socket 24. In the illustrated embodiment of the air filter 10, the outlet socket 24 projects, on the one hand, to the exterior away from the filter housing 12 and, on the other hand, inwardly into the filter housing 12.

The primary air outlet 20 can be embodied at a further outlet socket 26. In the illustrated embodiment of the air filter 10, the further outlet socket 26 projects, on the one hand, to the exterior away from the filter housing 12 and, on the other hand, inwardly into the filter housing 12.

The raw air inlet 18 can be embodied at an inlet socket 28. In the illustrated embodiment of the air filter 10, the inlet socket 28 projects to the exterior away from the filter housing 12.

The air filter 10 comprises moreover a filter element 30. The filter element 30 is illustrated in FIG. 2 in a further section view which is rotated in relation to FIG. 1 by 90°. FIG. 3 shows the filter element 30 in a perspective view.

The filter element 30 comprises a filter medium 32. The filter medium 32 annularly surrounds a longitudinal axis 33 of the filter element 30. The filter element 30 can be flowed through radially from the exterior to the interior. The filter medium 32 can be embodied folded in a star shape. At a first end face 34, the filter element 30 comprises a first end disk 36. At a second end face 38, the filter element 30 comprises a second end disk 40. The first and the second end faces 34, 38 are positioned at ends of the filter element 30 which are axially opposite each other. The first and the second end disks 36, 40 are each connected air-tightly to the filter medium 32, for example, welded.

Inside of the filter housing 12, the filter element 30 separates a raw side 42 from a clean side 44. The raw side 42 is the space outside of the filter element 14. The clean side 44 is the space within the filter medium 32 and between the end disks 36, 40. The second end disk 40 is of a closed embodiment for separation of the raw side 42 from the clean side 44. The raw side 42 can also be referred to as a raw chamber and the clean side 44 as a clean chamber. In operation of the air filter 10, raw air to be filtered flows through the raw air inlet 18 to the raw side 42. From the raw side 42, the air flows through the filter medium 32 and reaches as filtered clean air the clean side 44.

The first end disk 36 comprises a primary air passage 46. By means of the primary air passage 46, the clean side 44 communicates with the primary air outlet 20. The primary air passage 46 can be surrounded by an annular projection 48. The projection 48 projects in axial direction past the front face 50 of the first end disk 36. The front face 50 extends here in a plane which is perpendicular to the longitudinal axis 33. A seal element 52 can be held at the projection 48, in particular be molded to the projection 48. The seal element 52 seals the primary air outlet 20, here the further outlet socket 26, in relation to the first end disk 36. The primary air passage 46 and the projection 48 can be arranged coaxially to the longitudinal axis 33.

The filter element 30 comprises a secondary air passage 54. The secondary air passage 54 is formed by a channel 56. A wall of the channel 56 can be embodied as one piece together with the first end disk 36 and as a whole can annularly surround the channel 56. In other words, the first end disk 36 can delimit completely circumferentially the channel 56, compare in particular FIG. 2.

The filter medium 32 comprises a recess 58 at the first end face 34. In the region of the recess 58, a fold length of folds of the filter medium 32 measured in axial direction is shorter than in the remaining circumferential region of the filter medium 32. In other words, the recess 58 forms at the first end face 34 a depression in the filter medium 32. The recess can be obtained by laser cutting the filter medium prior to the star-shaped folding.

The channel 56 extends in the recess 58. Here, the channel 56 extends straight, in particular in radial direction in relation to the longitudinal axis 33 of the filter element 30. The channel 56 at least in sections, here completely, is arranged between the front face 50 of the first end disk 36 and the filter medium 32.

The channel 56, on the one hand, is open toward the clean side 44. On the other hand, the channel 56 opens into the secondary air outlet 22 of the filter housing 12. Through the secondary air passage 54, the clean side 44 communicates with the secondary air outlet 22. In other words, the channel 56 connects in fluid communication the clean side 44 to the secondary air outlet 22.

The channel 56 is embodied here in a passage socket 60. The passage socket 60 can be embodied as one piece together with the first end disk 36. At its radially outer end, the passage socket 60 projects past the filter medium 32. The passage socket 60 is connected air-tightly to the outlet socket 24, compare FIG. 1. In this way, the channel 56 is connected in fluid communication with the secondary air outlet 22. A seal element, not illustrated in detail, can be arranged between the passage socket 60 and the outlet socket 24. The seal element can be held at the passage socket 60, in particular be molded to the passage socket 60. The end of the passage socket 60 facing the secondary air outlet 22 is eccentrically arranged at the filter element 30, i.e., not on the longitudinal axis 33. Here, the end of the passage socket 60 facing the secondary outlet 22 projects radially away from the filter element 30.

The recess 58 can taper in axial direction away from the first end face 34, i.e., toward the second end face 38, compare in particular FIG. 2. The recess 58 is embodied here approximately V-shaped wherein the tip of the "V" facing the second end face 38 is rounded.

The first end disk 36 can comprise two seal surfaces 62 that serve for sealing the filter medium 32 in the region of the recess 58. The seal surfaces 62 are arranged here at a slant relative to the longitudinal axis 33. In this way, a flat contact of the seal surface 62 at the lateral regions of the recess 58 is provided. In the region of the lowermost location of the recess 58, the filter medium 32 is sealed by the wall of the channel 56 which is facing away from the front face 50. In the region of the recess 58, the filter medium 32 can be connected air-tightly to the end disk 36 in the same manner as in the remaining circumferential region, for example, be welded thereto, glued thereto or embedded therein.

FIG. 4 shows a flowchart of an assembly method for an air filter. The method will be explained in the following with the example of the afore described air filter 10, see also FIGS. 1 to 3.

In a first step 102, the filter element 30 is inserted into the housing pot 16 of the filter housing 12. For this purpose, the housing cover 14 has been removed from the housing pot 16. The insertion of the filter element 30 is carried out typically in a substantially straight movement along the longitudinal axis 33. Upon insertion, the passage socket 60 of the filter element 30 does not face the secondary air outlet 22 or the outlet socket 24 as a matter of principle. In this context, the first end disk 36 is pushed onto the further outlet socket 26, wherein an air-tight connection can be obtained between the further outlet socket 26 and the first end disk 36 around the primary air passage 46.

In a subsequent step 104, the filter element 30 is rotated relative to the filter pot 16 about the longitudinal axis 33 until the passage socket 60 and the secondary air outlet 22 or outlet socket 24 are aligned so as to correspond with each other. In this way, a seal-tight connection between the passage socket 60 and the outlet socket 24 is established. In particular, in this context a seal element (not illustrated in detail in FIG. 1) can be arranged between the passage socket 60 and the outlet socket 24. The radial position of the filter element 30 in the housing pot 16 can be defined by the projection 48, surrounding the primary air passage 46, being guided at the further outlet socket 26. Preferably, the rotational end position of the filter element 30 which is established in step 104, in which the passage socket 60 corresponds with the outlet socket 24, is secured by locking of a holding element (not illustrated in detail in FIGS. 1 to 3) of the filter element 30 at the housing pot 16.

Subsequently, in a step 106 the housing cover 14 is placed onto the housing pot 16. The housing cover 14 can secure the axial position of the filter element 30 relative to the housing pot 16, for example, can interact by means of an axial stop, not illustrated in detail, which interacts with the second end disk 40.

What is claimed is:

1. A filter element comprising:
a filter medium that annularly surrounds a longitudinal axis of the filter element, wherein the filter medium is configured to be flowed through radially from an exterior to an interior, and wherein the filter medium comprises a plurality of folds;
a first end disk arranged at a first end face of the filter element;
a primary air passage and a secondary air passage;
wherein the filter medium comprises a recess at the first end face, the recess extending axially from the first end face;
wherein the first end disk comprises a channel forming the secondary air passage, the channel extending radially in the recess of the filter medium;

wherein the plurality of folds include first folds in a region of the recess and second folds in a region circumferentially away from the recess, wherein an axial length of the first folds is reduced relative to an axial length of the second folds.

2. The filter element according to claim 1, wherein the primary air passage is a central primary air passage.

3. The filter element according to claim 1, wherein the first end disk comprises a wall that at least partially circumferentially surrounds the channel, wherein the wall is formed as one piece together with the first end disk.

4. The filter element according to claim 1, wherein the channel extends radially in relation to the longitudinal axis of the filter element.

5. The filter element according to claim 1, wherein the channel originates radially inwardly at the filter medium and is arranged between an axial front face of the first end disk and the filter medium.

6. The filter element according to claim 1, wherein the recess, beginning at the first end face, tapers in an axial direction in relation to the longitudinal axis of the filter element.

7. The filter element according to claim 1, wherein the first end disk comprises at least one seal surface sealing the filter medium at the recess.

8. The filter element according to claim 7, wherein the at least one seal surface is slanted in relation to the longitudinal axis.

9. The filter element according to claim 1, wherein the filter medium is folded in a star shape.

10. The filter element according to claim 1, wherein the recess is produced by cutting the filter medium by laser cutting, by a rolling knife, by ultrasonics, by a band saw or by water jet cutting.

11. The filter element according to claim 1, further comprising a second end disk arranged at a second end face of the filter element.

12. The filter element according to claim 11, wherein the second end disk is closed.

13. The filter element according to claim 1, wherein the primary air passage is embodied at the first end disk.

14. The filter element according to claim 1, further comprising an eccentrically arranged passage socket, wherein the channel extends through the eccentrically arranged passage socket.

15. The filter element according to claim 14, further comprising a seal element arranged at a free end of the passage socket.

16. The filter element according to claim 15, wherein the seal element is molded onto the passage socket or is embodied as one piece together with the passage socket.

17. An air filter comprising:
a filter housing comprising a raw air inlet, a primary air outlet, and a secondary air outlet;
a filter element according to claim 1 separating in the filter housing a clean side of the air filter from a raw side of the air filter communicating with the raw air inlet;
wherein the primary air outlet communicates via the primary air passage of the filter element with the clean side of the air filter and wherein the secondary air outlet communicates via the secondary air passage of the filter element with the clean side of the air filter.

18. The air filter according to claim 17, wherein the filter element further comprises an eccentrically arranged passage socket, wherein the channel extends through the eccentrically arranged passage socket, wherein the passage socket is connected sealingly to an outlet socket of the filter housing.

19. The air filter according to claim 18, wherein the filter element further comprises a seal element arranged at a free end of the passage socket.

20. A method for assembly of an air filter according to claim 18, the method comprising:

inserting the filter element into a housing element of the filter housing;

rotating the filter element about the longitudinal axis of the filter element to connect the passage socket and the outlet socket seal-tightly to each other.

\* \* \* \* \*